United States Patent [19]

Paine

[11] Patent Number: 4,609,904

[45] Date of Patent: Sep. 2, 1986

[54] ELECTRICALLY ISOLATED ACTUATION APPARATUS

[75] Inventor: John C. Paine, Chardon, Ohio

[73] Assignee: Caterpillar Industrial Inc., Mentor, Ohio

[21] Appl. No.: 630,567

[22] Filed: Jul. 13, 1984

[51] Int. Cl.[4] .......................... B60Q 1/00; H01H 3/16
[52] U.S. Cl. .................................... 340/52 R; 340/54; 340/55; 200/61.54; 307/10 R; 280/779
[58] Field of Search ............ 340/52 R, 54, 55, 825.72; 200/61.54–61.57; 307/10 R, 115, 122; 280/771, 779; 180/167, 6.2, 6.24, 6.28

[56]   References Cited

U.S. PATENT DOCUMENTS

| | | | |
|---|---|---|---|
| 3,559,205 | 1/1971 | Colby | 200/61.54 |
| 4,340,824 | 7/1982 | Shaw | 307/10 R |
| 4,350,971 | 9/1982 | Forrester et al. | 340/52 R |
| 4,386,279 | 5/1983 | Yoshimi et al. | 200/61.54 |
| 4,405,924 | 9/1983 | Shinoda et al. | 455/603 |
| 4,438,425 | 3/1984 | Tsuchida et al. | 307/10 R |
| 4,456,903 | 6/1984 | Kishi et al. | 307/10 R |
| 4,514,645 | 4/1985 | Endo et al. | 340/825.72 |

Primary Examiner—Donnie L. Crosland
Attorney, Agent, or Firm—Stephen L. Noe

[57]   ABSTRACT

An apparatus for controllably actuating an electrical device in response to movement of a control member is useful, for example, in an industrial vehicle, including a chassis, a power supply electrically isolated from the chassis, and a steering assembly having a rotatably connected steering wheel. The subject apparatus includes a control member mounted on and rotatable with the steering wheel. An excitation circuit is provided for supplying a predetermined excitation signal to a receiving circuit which responsively produces a control signal. The control signal is modified in response to a predetermined movement of the control member. A control circuit actuates and deactuates the electrical device in response to receiving the control and modified control signals. Thus, the apparatus controllably actuates the electrical device while maintaining the control member electrically isolated from the power supply. The steering wheel is free to rotate without interconnecting wires or slip rings.

4 Claims, 7 Drawing Figures

SECTION A-A

SECTION A-A

ELECTRICALLY ISOLATED ACTUATION APPARATUS

DESCRIPTION

1. Technical Field

This invention relates generally to an apparatus for controllably actuating an electrical device and, more particularly, to an apparatus for controllably actuating an electrical signaling device of a vehicle in response to movement of a control member.

2. Background Art

Electrical signaling devices, for example, audible horns, are in common use on vehicles today. Typically, such horns are located within the body of the vehicle and are powered by a battery carried on the vehicle. The horn is actuated by means of a control member, for example, a horn button, located within easy reach of the vehicle operator. The control member is advantageously located on the steering wheel of the vehicle.

The control member typically includes an electrical switch which responsively completes a circuit from the vehicle battery through the horn and back to the battery. In a typical passenger automobile, one pole or terminal of the battery is connected to the vehicle frame or chassis, and electrical accessories, such as the horn, utilize the chassis as the common return electrical circuit path. Therefore, control of the electrical accessories is accomplished with a single current carrying conductor in addition to the vehicle frame.

Mounting the control member and switch for a vehicle horn on the steering wheel presents a particular problem. Owing to the frequent rotation of the vehicle steering wheel, wires used to connect the horn to the switch frequently become fatigued, leading to reduced service life. Manufacturers have generally addressed this problem by either moving the switch and control member to a position separate from the steering wheel, for example, mounted on the stationary steering column, or by utilizing a slip ring system to maintain electrical contact between the horn and the switch without necessitating a direct wire connection.

Each of these approaches results in new problems. Locating the control member separate from the steering wheel makes it less convenient for operator use. The use of a slip ring introduces a highly unreliable mechanical component into the horn electrical circuit. Even in the relatively clean environment of a passenger automobile, slip rings frequently fail owing to contamination and mechanical wear of the contact surfaces.

The problems are exacerbated when the vehicle is an industrial vehicle, for example, an industrial lift truck. A lift truck horn is used on a frequent basis by the operator to warn pedestrians of the presence of the vehicle, and convenience of use is important. It is, therefore, highly desirable that the control member be located on the steering wheel proper. However, the reliability of slip rings is further degraded when utilized in an industrial atmosphere with all of the attendant contaminants.

Moreover, industrial regulations typically require the frame or chassis of an industrial vehicle to be substantially electrically isolated from both poles of the vehicle battery. Consequently, electrical accessories of the vehicle must be connected to the battery poles with two individual electrical conductors, exclusive of the vehicle chassis. In the case of a horn switch mounted on a rotatable steering wheel, conventional systems therefore require dual slip rings, making the horn system substantially less reliable than even a single slip ring system.

In addition to all of the problems discussed above, industrial vehicles typically suffer from a critical space shortage. The use of a dual slip ring system is often hampered or made impractical by the lack of available space within the steering column.

The present invention is directed to overcoming one or more of the problems as set forth above.

DISCLOSURE OF THE INVENTION

In one aspect of the present invention an apparatus for controllably actuating an electrical device of a vehicle is provided. The vehicle includes a chassis, a power supply having positive and negative terminals substantially electrically isolated from the chassis, a steering assembly connected to the chassis, and a steering wheel rotatably connected to the steering assembly. A control member is mounted on the steering wheel. Excitation means is provided for supplying a predetermined excitation signal to receiving means, which responsively produce a control signal. Means is also provided for modifying the control signal in response to a predetermined movement of the control member. Finally, controllable means is provided for receiving both the control signal and the modified control signal, actuating the signaling device in response to receiving one of the control and modified control signals, and deactuating the signaling device in response to receiving the other of the control and modified control signals.

The present invention facilitates placement of the control member on the rotatable steering wheel while obviating the need for slip rings. The invention, therefore, eliminates a failure prone element from conventional systems while maintaining electrical isolation between the vehicle power supply and chassis.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
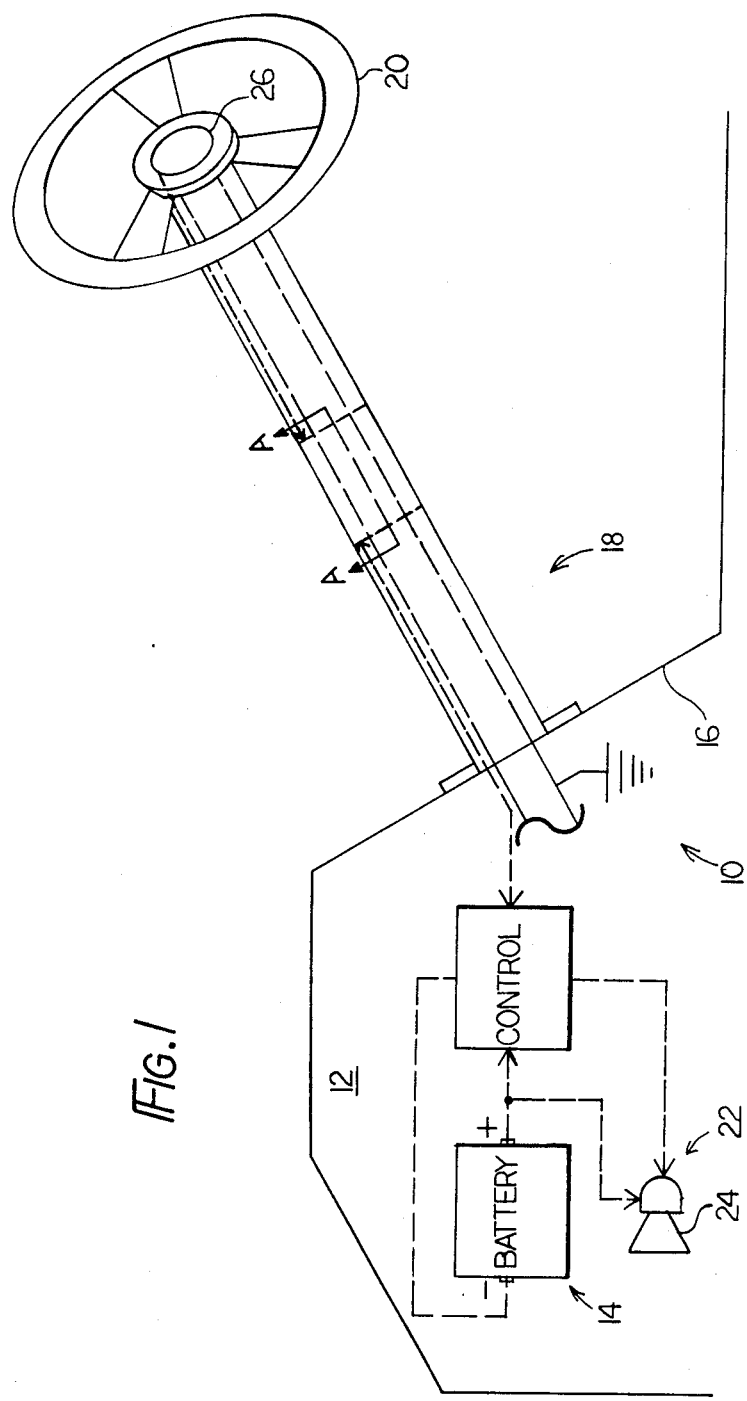
FIG. 1 is a partial pictorial view of a vehicle used with the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

The apparatus 10 is shown in conjunction with a vehicle 12, for example, an industrial vehicle such as a lift truck. The vehicle 12 includes a power supply 14, for example, a battery having positive and negative terminals, a chassis 16 substantially electrically isolated from each of the power supply terminals, a steering assembly 18 connected to the chassis 16, and a steering wheel 20 rotatably connected to the steering assembly 18. The vehicle 12 also includes an electrical device 22, for example, a horn 24, and a control member 26. The control member 26 is mounted on and rotatable with the steering wheel 20. The control member 26, electrical device 22, and power supply 14 are interconnected with the apparatus 10, which is adapted to controllably actuate the electrical device 22 in response to movement of the control member 26, as is hereinafter described.

Figure 2:
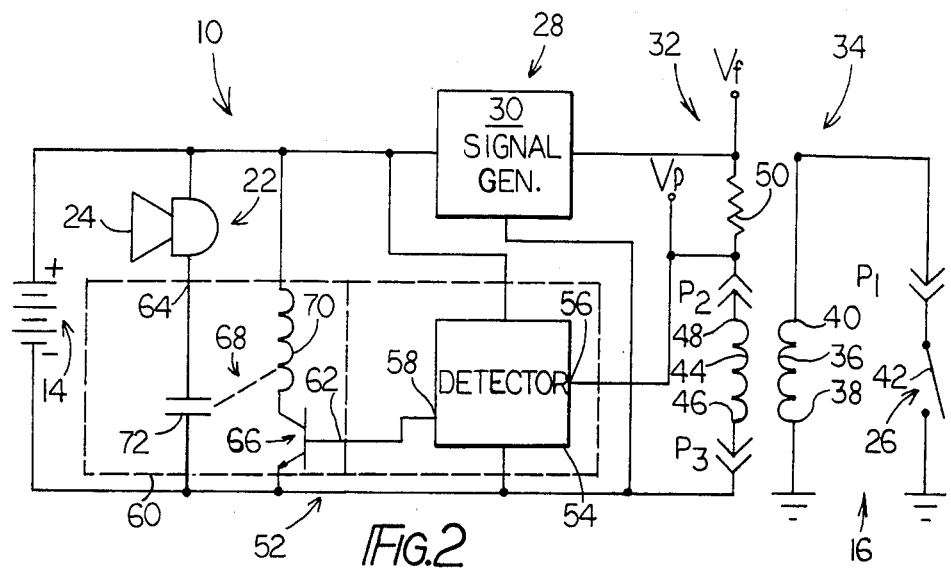
FIG. 2 is a schematic representation of an electric circuit used in one embodiment of the present invention.

Referring now to FIG. 2, the apparatus 10 includes excitation means 28 for substantially continuously supplying a predetermined excitation signal. The excitation means 28 is, for example, a signal generator 30 connected to the power supply positive and negative terminals, and having an output. The apparatus 10 also includes means 32 for receiving the excitation signal from the excitation means 28 and producing a control signal in response to the received excitation signal, and means 34 for modifying the control signal in response to a predetermined movement of the control member 26. The modifying means 34 is inductively coupled to and electrically isolated from the receiving means 32.

The modifying means 34 includes a first inductor 36 having first and second terminals 38,40. The first terminal 38 is connected to the vehicle chassis 16, shown and hereinafter described with the conventional chassis ground symbol. The second terminal 40 is connected through a switch 42 to chassis ground, with the switch 42 being operable in response to a predetermined movement of the control member 26. Thus, the switch 42 is effectively connected in a parallel or shunt configuration with the first inductor 36.

The receiving means 32 includes a second inductor 44 having third and fourth terminals 46,48. The third terminal 46 is connected to one of the positive and negative power supply terminals, and the fourth terminal 48 is connected through a resistor 50 to the output of the signal generator 30. The first and second inductors 36,44 are in inductive, flux coupled communication with one another but are electrically isolated from one another. Thus, the inductors 36,44 effectively form the respective coupled coils of an isolation transformer.

The apparatus 10 also includes controllable means 52 for receiving the control signal and the modified control signal, actuating the electrical device 22 in response to receiving one of the control and modified control signals, and deactuating the electrical device 22 in response to receiving the other of the control modified control signals. The controllable means 52 includes a signal detector 54 having an input 56 and an output 58. The input 56 is connected to the fourth terminal 48.

The output of the detector 54 is connected to a power control element 60 through an input 62. The power control element 60 has an output 64 and includes a solid state switch 66, for example, a transistor, and a relay 68. The relay 68 has a coil 70 connected in series with the solid state switch 66 across the positive and negative power supply terminals, and a set of controlled contacts 72 connected in series with the electrical device 22 across the positive and negative power supply terminals.

In the preferred embodiment, the signal generator 30 and detector 54 are portions of a single semiconductor chip manufactured by National Semiconductor Corp. of Santa Clara, Calif. and designated as part number LM1830. Although use of the preferred chip is advantageous in terms of size and cost, functionally identical circuits can be assembled from discrete components if desired.

Figure 5:
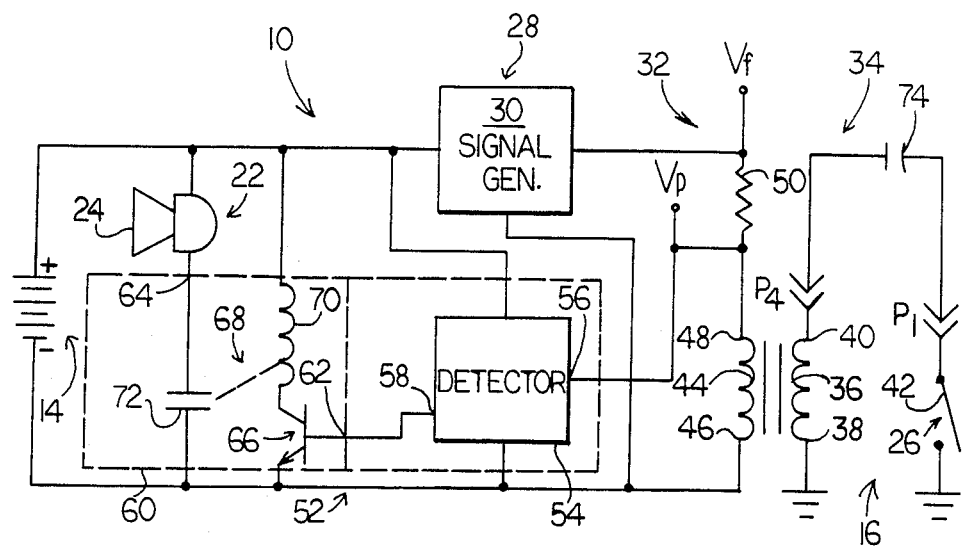
FIG. 5 is a schematic representation of an electric circuit used in a second embodiment of the present invention.

Referring now to FIG. 5, the schematic representation of an alternative embodiment is exactly the same as that described above with reference to FIG. 2 with the exception of the modifying means 34. The modifying means 34 includes a capacitor 74 connected in series with the switch 42, the series combination being connected in parallel with the first inductor 36. In addition, the first and second inductors 36,40 are wound on a common ferrous core to provide maximum flux coupling.

Figure 3:
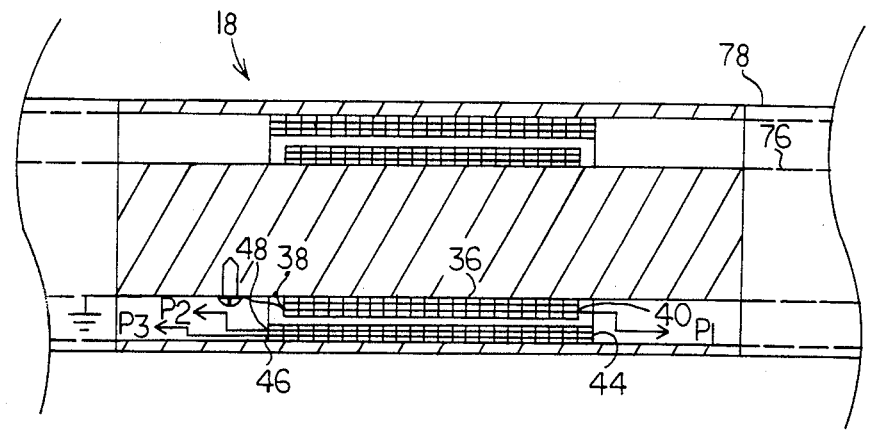
FIG. 3 is a partially sectioned view of a portion of a vehicle steering column used in the embodiment of FIG. 2.

Referring next to FIG. 3, the preferred embodiment of the section AA depicted in FIG. 1 is shown. The steering assembly 18 includes a conventional steering shaft 76 and steering column 78, with the steering shaft 76 being connected to the chassis 16 and the steering column 78 coaxially positioned about the steering shaft 76. The steering shaft 76 is typically a solid steel shaft passing axially through the hollow steel tube of the steering column 78.

The first inductor 36 is a substantially cylindrical wire coil attached or mounted to and having the first terminal 38 electrically connected to the steering shaft 76. With the exception of the first terminal 38, the first inductor 36 is electrically insulated from the steering shaft 76. The second inductor 44 is a substantially cylindrical wire coil attached or mounted to and electrically insulated from the steering column 78. The second inductor 44 is coaxially positioned about the first inductor 36.

Figure 6:
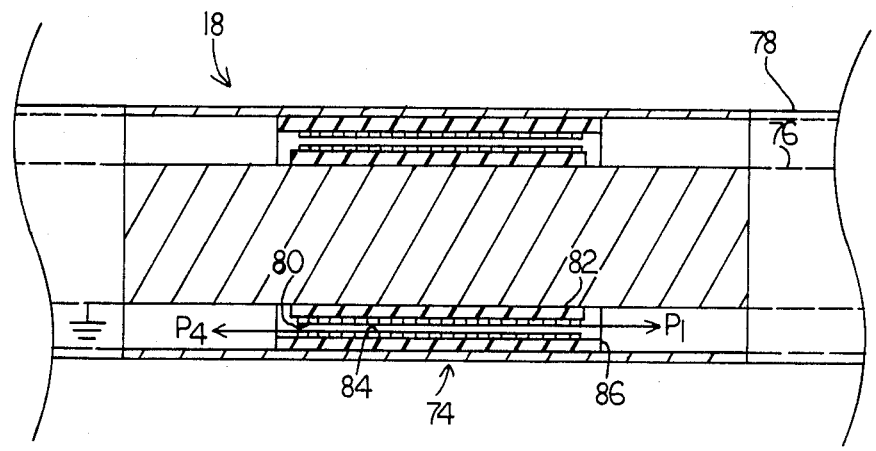
FIG. 6 is a partially sectioned view of a portion of a vehicle steering column used in the embodiment of FIG. 5; and, FIG. 7 is a series of waveforms associated with the schematic of FIG. 6.

In FIG. 6, the alternative embodiment of section AA of FIG. 1 is shown. In place of the first and second inductors 36,44, as discussed above with reference to FIG. 3, the capacitor 74 has a first substantially cylindrical conductive plate 80 attached to the steering shaft 76. The plate 80 is electrically insulated from the steering shaft 76 by an insulator 82. A second substantially cylindrical conductive plate 84 of the capacitor 74 is attached to and electrically insulated from the steering column 78, and includes an insulator 86. The second plate 84 is coaxially positioned about the first plate 80.

In each of the FIGS. 3 and 6, the terminals designated as P1-4 connect to the corresponding terminals depicted in the respective schematics of FIGS. 2 and 5.

The ratings and values shown for various electrical elements discussed above are for exemplary purposes only. Alterations of the circuit and embodiments discussed and the use of electrical elements of different constructions or ratings will be readily apparent to those skilled in the art. Such alterations or substitutions can be implemented without departing from the appended claims.

INDUSTRIAL APPLICABILITY

Figure 4:
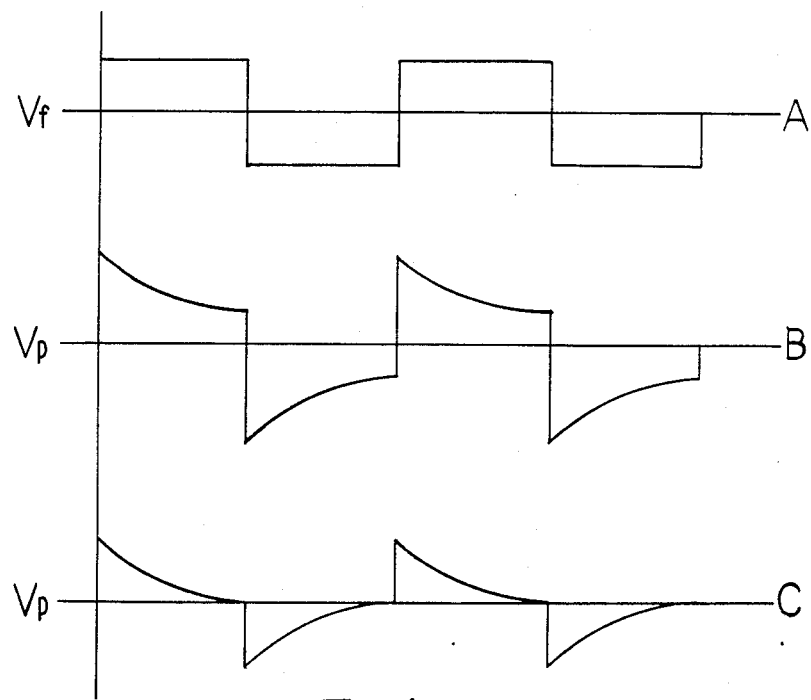
FIG. 4 is a series of waveforms associated with the schematic of FIG. 2.

Operation of the apparatus 10 is described with reference to use on an industrial lift truck such as that depicted in FIG. 1. Throughout this description, reference is made to the voltage/current waveforms shown in FIGS. 4 and 7. These waveforms are observable at reference points indicated on the schematic diagrams of FIGS. 2 and 5.

Referring first to FIG. 2, and assuming that switch 42 is open, the apparatus 10 is in a quiescent state. The signal generator 30 delivers the excitation signal shown by the waveform at FIG. 4A to the receiving means 32, as observed at point $V_f$. The excitation signal is preferably a continuously repeating waveform having a frequency in the range of 5 to 15 kilohertz. The receiving means 32 responsively produces the control signal shown by the waveform at FIG. 4B, as observed at point $V_p$. In response to receiving the control signal, the detector 54 produces a signal to bias the solid state switch 66 "off", deenergizing the relay 68 and the horn 24.

Pressing the control member 26 closes the switch 42, shunting the first inductor 36. Owing to the inductive coupling between the first inductor 36 of the modifying means 34 and the second inductor 44 of the receiving means 32, the control signal observed at point $V_p$ is modified as shown by the waveform at FIG. 4C. In response to receiving the modified waveform, the detector 54 produces a signal to bias the solid state switch 66 "on", energizing the relay 66 and the horn 24.

Figure 7:
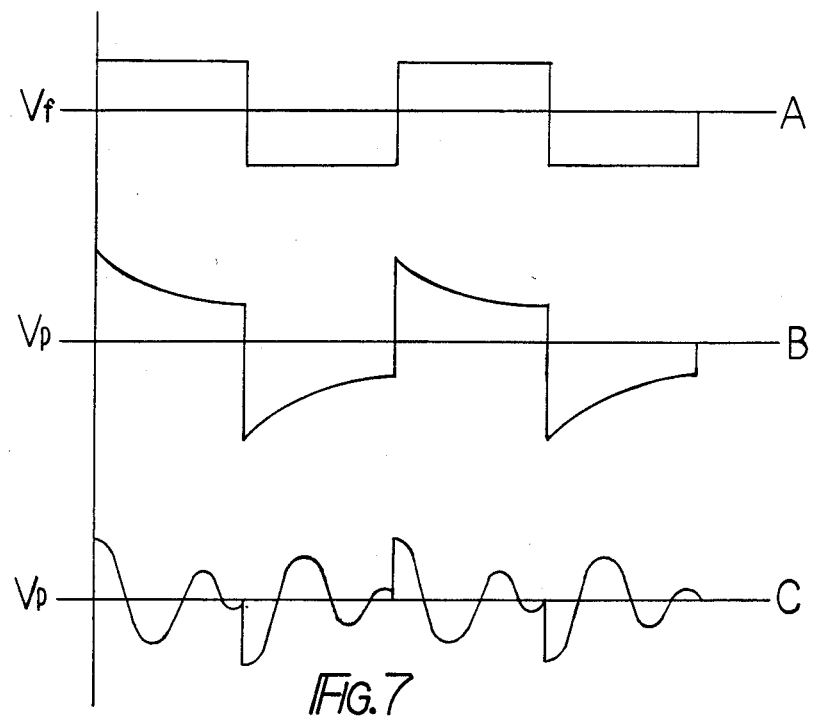

Referring now to FIGS. 5 and 7, the above discussion of the apparatus 10 in the quiescent state remains unchanged, with the waveforms at FIGS. 7A and 7B, as observed at respective points $V_f$ and $V_p$, being substantially identical to those respectively shown at FIGS. 4A and 4B. However, in response to closing the switch 42 the capacitor 74 is placed in parallel with the inductor 36, and the waveform shown at FIG. 7C is observed at point $V_p$ as the modified control signal. The detector 54 reacts to the modified control signal of FIG. 7C just as to the modified control signal of FIG. 4C, energizing the solid state switch 66, the relay 68, and the horn 24. The second embodiment of FIGS. 5 and 6 is especially advantageous where space within the steering column 78 is particularly limited, owing to the small amount of space required by the capacitor 74.

Thus, in each of the above-described embodiments, the apparatus 10 controllably actuates the vehicle horn 24 while maintaining the means 34 electrically isolated from the balance of the control circuitry. As shown in FIGS. 3 and 6, the steering wheel 20 is free to rotate relative to the steering column 78, since no interconnecting wires are necessary. In addition, the use of troublesome and unreliable slip rings is entirely avoided, and the chassis 16 remains electrically isolated from the power source 14.

Other aspects, objects, advantages and uses of this invention can be obtained from a study of the drawings, the disclosure, and the appended claims.

I claim:

1. Apparatus for controllably actuating an electrical signaling device of a vehicle, said vehicle including a chassis, a steering assembly having a steering shaft connected to said chassis, a steering column coaxially positioned about said steering shaft, and a steering wheel rotatably connected to said steering shaft, comprising:

a power supply having positive and negative terminals electrically isolated isolated from said chassis;

a first inductor having first and second terminals, said first terminal being connected to said steering shaft and said first inductor being coaxially mounted on said steering shaft;

a switch connected between said chassis and said first inductor second terminal and being carried on and rotatable with said steering wheel;

a second inductor having third and fourth terminals, said third terminal being connected to one of said positive and negative power supply terminals, said second inductor being mounted on and electrically isolated from said steering column and positioned to coaxially surround said first inductor and being in inductive communication with and electrical isolation from said first inductor;

a signal generator having an output terminal connected to said fourth terminal;

a signal detector having an input terminal connected to said fourth terminal, and an output terminal; and a power control element having an input terminal connected to said detector output terminal and an output terminal connected to said signaling device.

2. Apparatus for controllably actuating an electrical signaling device of a vehicle, said vehicle including a chassis, a steering assembly having a steering shaft connected to said chassis, a steering column coaxially positioned about said steering shaft, and a steering wheel rotatably connected to said steering shaft, comprising:

a power supply having positive and negative terminals electrically isolated from said chassis;

a first inductor having first and second terminals, said first terminal being connected to said chassis;

a capacitor having first and second substatially cylindrical conductive plates, said first plate being coaxially mounted on and electrically insulated from said steering shaft and being connected to said first inductor second terminal, and said second plate being mounted coaxially around said first plate on said steering column, and being electrically insulated from said steering column;

a switch connected between said capacitor second plate and said chassis and being carried on and rotatable with said steering wheel; and a second inductor having third and fourth terminals, said third terminal being connected to one of said positive and negative power supply terminals, said second inductor being in inductive communication with and electrical isolation from said first inductor.

3. Apparatus, as set forth in claim 2, including a signal generator having an output terminal connected to said fourth terminal;

a signal detector having an output terminal, and an input terminal connected to said fourth terminal; and a power control element having an input terminal connected to said detector output terminal and an output terminal connected to said signaling device.

4. Apparatus for controllably actuating an electrical signaling device of a vehicle, said vehicle including a chassis, a steering assembly having a steering shaft connected to said chassis, a steering column coaxially positioined abut said steering shaft, and a steering wheel rotatably connected to said steering shaft, comprising:

a power supply having positive and negative terminals electrically isolated from said chassis;

a first inductor having first and second terminals, said first terminal being connected to said chassis;

a switch connected between said chassis and said first inductor second terminal and being carried on and rotatable with said steering wheel;

a second inductor having third and fourth terminals, said third terminal being connected to one of said positive and negative power suply terminals, said second inductor being in inductive communication with and electrical isolation from said first inductor;

a capacitor serially connected between said first inductor and said switch, said capacitor having a first substantially cylindrical conductive plate attached to and electrically insulated from said steering shaft and a second substantially cylindrical conductive plate attached to and electrically insulated from said steering column, said second plate being substantially coaxially positioned around said first plate;

a signal generator having an output terminal connected to said fourth terminal;

a signal detector having an input terminal connected to said fourth terminal, and an output terminal; and a power control element having an input terminal connected to said detector output terminal and an output terminal connected to said signaling device.

* * * * *